United States Patent [19]

Hill et al.

[11] 4,125,520

[45] Nov. 14, 1978

[54] POLYESTER OF A CYCLIC DIACID ANHYDRIDE WITH AN EPOXIDE

[75] Inventors: James C. Hill, Chesterfield; Walter R. Knox, St. Louis, both of Mo.

[73] Assignee: Monsanto Company, St. Louis, Mo.

[21] Appl. No.: 875,967

[22] Filed: Feb. 8, 1978

Related U.S. Application Data

[62] Division of Ser. No. 646,215, Jan. 2, 1976, Pat. No. 4,094,865.

[51] Int. Cl.$^2$ ............... C08G 63/00; C08G 59/00
[52] U.S. Cl. .................. 260/830 TW; 528/93; 528/103
[58] Field of Search .......... 260/47 EQ, 75 EP, 78.41; 526/11.2

[56] References Cited

U.S. PATENT DOCUMENTS

| | | | |
|---|---|---|---|
| 3,213,067 | 10/1965 | Pohl et al. | 260/75 EP |
| 3,370,043 | 2/1968 | Milligan | 260/75 EP |
| 3,627,720 | 12/1971 | Hinton et al. | 260/75 EP |
| 3,723,390 | 3/1973 | Carpenter et al. | 260/75 M |
| 3,766,146 | 10/1973 | Thompson | 260/75 EP |
| 3,864,316 | 2/1975 | Robinson | 260/78.41 |
| 3,979,368 | 9/1976 | Malfroid | 526/11.2 |
| 4,028,289 | 6/1977 | Brown | 260/2.5 N |

*Primary Examiner*—Lucille M. Phynes
*Attorney, Agent, or Firm*—James C. Logomasini; Paul L. Passley; Neal E. Willis

[57] ABSTRACT

The invention provides a process for the production of a polyester which comprises initiating a reaction between a polyterminal epoxide being the reaction product of one mole bisphenol A and two moles of epichlorohydrin, a mono-terminal epoxide and a cyclic diacid anhydride in the presence of a catalytically effective quaternary salt heating to a point at which the reaction becomes a self-sustaining exothermic reaction and controlling the reaction such that the temperature of the mixture is not reduced until after the exothermic reaction has begun to subside.

6 Claims, No Drawings

POLYESTER OF A CYCLIC DIACID ANHYDRIDE WITH AN EPOXIDE

BACKGROUND OF THE INVENTION

This is a division of co-pending application Ser. No. 646,215 filed Jan. 2, 1976, now Pat. No. 4,094,865.

This invention relates to polyesters and specifically polyesters having a controlled degree of crosslinking obtained by the reaction of dicarboxylic acid anhydrides with epoxides.

It is well known that linear polyesters are obtained as a result of the reaction of an epoxide with a dicarboxylic acid anhydride. Early work on this subject is described in an article by R. F. Fischer in Journal of Polymer Science, Vol. XLIV, pp. 155-172 (1960). In that article, Fisher examined the reaction of epoxides such as allyl glycidyl ether, epichlorohydrin, propylene oxide and vinylcyclohexene mono-epoxide with anhydrides such as phthalic anhydride and maleic anhydride to produce linear polyesters. He round that the reaction was catalyzed by tertiary amines and quaternary salts, that the molecular weight of the polyester could be controlled by the presence of active hydrogen-containing compounds such as alcohol and water and that the reaction is independent of monomer concentration.

A similar reaction is described in U.S. Pat. No. 2,966,479 which describes heating a polybasic acid anhydride with a monoepoxide in the presence of a catalyst which is a tertiary amine or a quaternary ammonium salt, under substantially anhydrous conditions and at a temperature of above 70° C. A continuous multistage process for producing linear polyesters by this type of reaction, but using a different catalyst system and staged addition of the epoxide, is disclosed in U.S. Pat. No. 3,723,390.

In addition to the large amount of art on such linear polyesters, there is much art on the reaction of polyepoxides with dicarboxylic acid anhydrides to produce highly cross-linked materials. This art is exemplified by U.S. Pat. No. 3,692,715 which describes a heat curable epoxy resin composition obtained by reacting a polyglycidyl ether of a polyhydric phenol or a polyglycidyl ester of an aromtic or cycloaliphatic polycarboxylic acid with a dicarboxylic acid anhydride using as a catalyst an aliphatic carboxylic acid salt of a polyvalent metal.

A useful reference book on highly cross-linked epoxide polymers (commonly known as epoxy resins) is "Epoxy Resins" by I. Skeist and G. R. Somerville (Reinhold, 1958).

Commercial epoxy resins are obtained by a variety of processes which include homopolymerization of a polyepoxy compound and reaction of such a compound with a minor proportion, usually about 6-15% by wt., of a curing agent that is conventionally a polyamine, wuch as diethylene triamine, or dimethylaminopropylamine, or 30-40% by wt. of a polyamide resin, or 35-40% by wt. of an anhydride such as phthalic anhydride. It will be appreciated that where an anhydride is used, the product is substantially a polyester.

The difference between the reactions producing linear and crosslinked polyesters can be more fully appreciated by reference to the following reaction formulae by which each may be prepared. The anhydride common to both is maleic anhydride through this is only for the sake of illustration, and it is understood that the maleic anhydride could be wholly or partially replaced by a different cyclic acid anhydride.

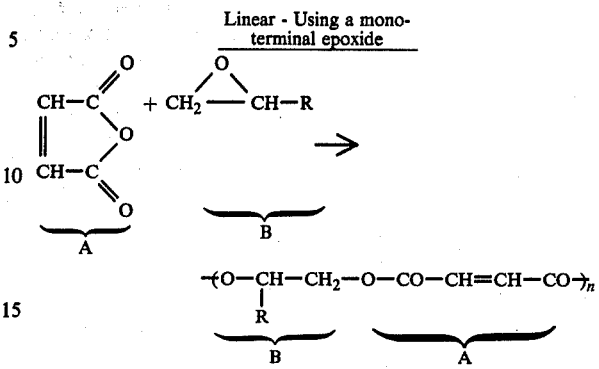

where R is a monovalent hydrocarbyl radical.

It will be obvious that, in theory at least, a monoepoxide reacted with an anhydride will produce a linear product having an $+A\ BA\ B\ AB+$ type structure. However, in practice it is necessary to take steps to avoid or minimize consecutive addition of epoxy units which gives rise to polyether segments. In addition when maleic anhydride is used special techniques must be used to avoid crosslinking via the double bond of the anhydride. Polyether segments usually lead to soft, rubbery polymers and cross-linking via the double bonds of the maleic anhydride gives rise to polyesters that are black weak foams (the result of partially decomposition of anhydride) with no commercial value.

Cross-linked

If on the other hand, a di-terminal epoxide is used, the reaction will proceed as follows:

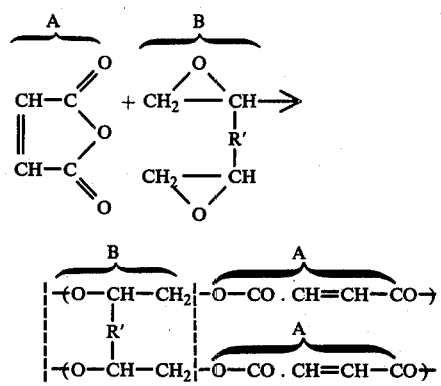

where R' is a divalent hydrocarbyl radical.

The reaction will, according to accepted theory therefore, produce on cross-linkage for every di-epoxide molecule reacted.

As is predictable, the properties of these linear and highly cross-linked products are very different. The properties of linear polyesters vary according to the epoxide used. With alkylene oxides such as ethylene oxide the polyesters are usually soft and tacky particularly when an excess of epoxide is used but with e.g. styrene oxide, the polyesters tend to be harder and more brittle but have little dimensional strength. The anhydride used has a similar effect in that polyesters made using (e.g. succinic and glutaric acid anhydrides tend to have lower polymer melt temperatures than those made using maleic or phthalic anhydrides. The crosslinked polyesters on the other hand are very hard and have good dimensional strength.

Linear polyesters obtained by the above process and incorporating an unsaturated anhydride such as maleic anhydride have found significant commercial applications in the form of solutions in styrene which are copolymerized in the presence of glass fibers to provide the well-known fiberglass-type products.

Cross-linked polyesters of the type described above have found extensive use as adhesives (the so-called "epoxy" resins) and to some extent as molding materials, though these tend to be of limited use in view of the great rigidity and a tendency to brittleness that they display. An even greater disadvantage is the high cost of the polyepoxy component which makes such polyesters extremely expensive.

It has now been found that apart from producing highly crosslinked polymers with great thermal stability, it is possible to produce a relatively low-cost polyester with a controlled amount of cross-linking that retains its thermoplastic character and has a very useful combination of properties making it suitable for a variety of applications for which both the linear and cross-linked polyesters are totally unsuited.

Surprisingly, it has been found that there is no simple relationship between the physical properties of the polymer and the amount of cross-linking, and an area intermediate the extremes has been defined in which the polymers have excellent properties without some of the deficiencies apparent with either wholly linear or fully cross-linked polymers. The type of product obtained can, moreover, be tailored to end-uses ranging from adhesives through foams and polymer concretes to molding compositions.

SUMMARY OF THE INVENTION

The present invention provides a polyester formed by a process which comprises the following stages;
a. forming a mixture of a cyclic diacid anhydride, a poly-terminal epoxide and a monoterminal epoxide, the ratio of total epoxy groups to cyclic diacid anhydride groups being from 1:1 to 2:1 and the epoxy-equivalent mole ratio of polyepoxide to monoepoxide being from 0.01 to 1.0, and adding to said mixture a catalytically effective quaternary salt in an amount that is from 0.0001 to 0.2 mole per mole of anhydride,
b. initiating a non-self-sustaining exothermic reaction between the epoxide and anhydride components of the mixture,
c. raising the temperature of the mixture to a point at which the exothermic reaction becomes self-sustaining and
d. controlling the reaction conditions during the self-sustaining exothermic reaction such that the temperature of the reaction mixture is not substantially reduced until after the rate of evolution of heat by the reaction has begun to decrease:

the time spent in stages b and c combined being less than 600, and preferably less than 200, seconds. In preferred reactions, the time taken in stage d from the initiation of the self-sustaining exothermic reaction to the attainment of the maximum temperature reached is less than 600, and most usually less than 200, seconds.

The reaction between the epoxides and the anhydride proceeds in two stages. In the first stage, the reaction is mildly exothermic but is non-self-sustaining. By this is meant that if external heat to the reaction mixture were removed the reaction would slow down and cease leaving a substantial proportion of the monomer unreacted.

The second stage of the reaction begins when the reaction mixture reaches a point at which, if external heat to the reaction mixture were removed, it would nevertheless continue to evolve heat until a peak temperature were reached and substantially all available monomer consumed and only thereafter would the temperature of the reaction mixture drop. At this point the reaction becomes "self-sustaining" as the term is used herein. It is recognized that if the reaction were to be carried out in a very thin mold or in the presence of a large amount of inert material that could act as a heat sink, the amount of surface heat lost through the walls of the mold could necessitate the addition of heat to ensure that the reaction proceeds to completion. The term "self-sustaining" therefore must be understood to refer to the nature of the reaction when performed using 5.00gm of given reaction mixture in a 20mm × 150mm test tube.

The time periods specified above are important since during the non-self-sustaining exothermic reaction many relatively short polymer chains are being formed and these chains do not apparently combine when the rapid self-sustaining exothermic reaction is initiated. Thus, if the first stage is prolonged a large number of polymer chains are formed and the size of individual polymer molecules in the final product is much reduced. The consequence is lower polymer melt temperature and higher acid number (where these are measurable) and reduced properties in the final polymer. It is therefore critical that the chainforming operation take place as quickly as possible and this is an important characteristic of the process by which the polyesters of the invention are produced.

Polymers produced by the process of the invention are quite different from those of the prior art. Thus, while it is known to use monoepoxides as reactive diluents for poly-terminal epoxides in the preparation of epoxy resins, the amounts used are very much smaller than in the case of the present invention, Skeist, in the book "Epoxy Resins" cited above, specifies an upper limit of 15% by wt. on p18–19. This limitation is of course far below the proportion used in the present invention where the poly-terminal epoxide is used in relatively small amounts to modify the product obtained using a monoterminal epoxide.

While the process is applicable to monoterminal epoxides generally, the reaction conditions tend to cause vaporization of low molecular weight epoxides and the process must therefore be carried out under pressure. For this reason it is often preferred that the monoterminal epoxide contains an aromatic radical since such epoxides do not give rise to such problems. Thus a particularly preferred monoepoxide is styrene oxide and polymers made using styrene oxide are preferred polymers of the invention.

Such preferred polymers of the invention are characterized by having an acid number of not more than 65 and a polymer melt temperature of at least 50° C.

The acid number is a reflection of the number of free (residual or terminal) acid of anhydride groups in the polymer and hence is an indication of molecular weight. However, this indication is not necessarily conclusive since by increasing the ratio of epoxide to anhydride groups it is possible to reduce greatly the number of free acid groups present and hence the acid number. For this reason preferred polymers prepared by the process of the invention are characterized by having both an acid number not more than 65 and a polymer melt temperature of greater than 50° C and preferably greater than 60° C. As has been indicated above an excess of epoxide groups often leads to homoplymerization of the epoxide to give polyether segments and these conventionally lead to soft tacky polymers outside the scope of this invention. In addition, low molecular weight polymers could be formed, under appropriate conditions, that do not have a large number of terminal acid groups and would therefore have a low acid number. They would, which reaches a peak temperature of from 229° to 237° C in a period of from 18 to 45 seconds after initiation to yield a linear polyester having a polymer melt temperature of at least 50°0 C and an acid number not greater than 65.

Thirty-three catalysts were assessed against the above standard and the results are set forth in Table 1 to give a general indication of the type of salts that have proved to be within the term "catalytically effective quaternary salt" as it is used herein. Each run lasted a total of 15 minutes except those runs indicated by a prime which were completed in 5 minutes.

TABLE 1

| Run No. | Catalyst | Time To Exothermic Stage, Sec. | Threshold Of Exothermic Stage, °C | Time From Threshold To Max. Temp., Sec | Max. Temp. °C | Acid No. | Polymer Melt °C | Rate |
|---|---|---|---|---|---|---|---|---|
| 1 | $(CH_3)_4NOH \cdot 5H_2O$ | 73 | 160 | 27 | 235 | 55 | 72 | G |
| 2 | $(Et)_4 NO\phi$ | 110 | 170 | 30 | 237 | 13 | 79 | G |
| 3 | $(CH_3)_4 NCl$ | 110 | 178 | 40 | 235 | 25 | 75 | G |
| 4 | $(Bu)_4 NCl$ | 90 | 175 | 30 | 235 | 33 | n.d. | G |
| 5 | $(Et)_3 (\phi CH_2)NCl$ | 125 | 180 | 45 | 230 | 32 | 83 | G |
| 6 | $(CH_3)_4NBr$ | 150 | 190 | 45 | 232 | 63 | 66 | G |
| 7 | $(Et)_4NBr$ | 95 | 170 | 25 | 232 | 7 | 67 | G |
| 8 | $(Bu)_4NBr$ | 122 | 166 | 28 | 230 | 10 | 65 | G |
| 9 | $(Spiro)NBr$ | 100 | 175 | 30 | 236 | 9 | 83 | G |
| 10 | $(Hept)_4NBr$ | 92 | 175 | 18 | 234 | 18 | 70 | G |
| 11 | $(Oct)_3PrNBr$ | 100 | 175 | 30 | 232 | 27 | 72 | G |
| 12[1] | $\phi CH_2(CH_3)_3NBr$ | 160 | 185 | 30 | 229 | 65 | n.d. | G |
| 13 | $(CH_3)_4 NI$ | 105 | 183 | 30 | 237 | 66 | 60 | B |
| 14 | $(Bu)_4 NI$ | 85 | 165 | 25 | 235 | 119 | n.d. | U |
| 15 | $(Pent)_4 NI$ | 110 | 170 | 25 | 235 | 73 | n.d. | U |
| 16 | $(Hex)_4 NI$ | 110 | 160 | 25 | 233 | 90 | L.R.T. | U |
| 17 | $(Hept)_4 NI$ | 115 | 160 | 30 | 233 | 93 | L.R.T. | U |
| 18 | $(CH_3)_3\phi N Cl$ | 180 | 186 | 150 | 205 | 63 | n.d. | U |
| 19 | $(CH_3)_3 \phi N Br$ | 180 | 193 | 180 | 211 | 61 | n.d. | U |
| 20 | $(CH_3)_3\phi NI$ | 150 | 187 | 120 | 207 | 88 | L.R.T. | U |
| 21 | $(Et)_4 N B F_4$ | 115 | 170 | 17 | 243 | 86 | 58 | B |
| 22 | $(Bu)_4 N P F_6$ | 210 | 185 | 95 | 239 | 122 | 65 | U |
| 23[1] | $(BrCH_2CH_2)(CH_3)_3 N Br$ | 180 | 180 | 75 | 228 | 68 | n.d. | U |
| 24[1] | $\phi CH_2(CH_3)_2 N$ | 150 | 188 | 75 | 210 | 56 | n.d. | U |
| 25[1] | $\phi CH_2(CH_3)_2\phi N \cdot CH_2OH$ | 155 | 190 | 15 | 210 | 41 | n.d. | B |
| 26[1] | $\phi CH_2(CH_3)_2\phi N \cdot CH_2Br$ | 120 | 145 | 50 | 208 | 24 | n.d. | B |
| 27[1] | $\phi CH_2(\phi)_3 P Cl$ | 100 | 138 | 10 | 230 | 12 | n.d. | G |
| 28[1] | $Bu (\phi)_3 P Br$ | 105 | 130 | 25 | 232 | 14 | n.d. | G |
| 29 | $Zn(OAc)_2 \cdot 2H_2O$ | 45 | 100 | 30 | 210 | 288 | L.R.T. | U |
| 30 | $C_6H_5OPO_3Na_2$ | 180 | 183 | 80 | 235 | 86 | n.d. | B |
| 31 | LiCl | 210 | 182 | 210 | 225 | 87 | n.d. | U |
| 32 | LiBr | 210 | 186 | 150 | 225 | 110 | L.R.T. | U |
| 33 | $MgCO_3$(N.F.) | 240 | 186 | 120 | 221 | 287 | L.R.T. | U |
| 34 | -None- | 300 | 184 | 540 | 193 | 254 | L.R.T. | U |

Rating Code
G = Good
B = Borderline
U = Unsatisfactory
Abbreviations
$\phi = C_6H_5$
n.d. = not determined
L.R.T. = less than room temperature however, have a very low polymer melt temperature.

Whenever referred to herein, the acid number is understood to mean the mg. of potassium hydroxide to neutralize free (residual or terminal) acid groups and residual anhydride in one gram of the polymer and the acid number and polymer melt temperature are measured by the methods described in "Preparative Methods of Polymer Chemistry" by Sorenson and Campbell (Interscience Publishers, Inc., 1961).

The term "quaternary salt" is intended to cover quaternary ammonium and quaternary phosphonium salts as well as mixtures of compounds which form a quaternary salt in situ, such as a mixture of a tertiary amine and a $C_1$-$C_{10}$ alkyl or aralkyl halide.

By the term "catalytically effective quaternary salt" is to be understood a quaternary salt that, when mixed with styrene oxide and phthalic anhydride in an oxide to anhydride to salt molar ratio of 1.3:1.0:0.17 and heated at 180° C and atmospheric pressure initiates an exothermic reaction in less than 160 seconds (including time to heat the mixture from ambient temperature to 180° C)

The epoxy equivalent mole ratio of diepoxide to monoepoxide used to produce the polyesters of the invention lies between 0.01 and 1.00 but the preferred ratio depends on the end use of the product.

The term "epoxy-equivalent mole raito" is defined as the ratio of (the grams of the polyepoxide divided by polyepoxide equivalent weight) to (the grams of monoepoxide divided by the monoepoxide equivalent weight). The epoxy equivalent wt. of the di-terminal epoxide of bisphenol A for example is 188 i.e., the molecular weight divided by two and for styrene oxide it is 120, (i.e., molecular weight divided by 1).

Unexpectedly, it is found that when the amount of cross-linking is controlled by maintaining the epoxyequivalent mole ratio of polyepoxide to monoepoxide within the stated limits, the product has certain physical and processing properties that are better than those of the corresponding polymers containing polyepoxide proportions either greater than or less than those within the claimed range. There is, for example, a marked improvement in flexural strength in this area.

Further, the polymer is sufficiently strong to support foam formation unlike polymers with a lower polyepoxide content which do not have the heat-strength properties to form a stable foam at the reaction temperature and as a result collapse, and those with a higher polyepoxide content which become too stiff too quickly to permit expansion.

In addition, if a filler is added to the polymerization system, a polymer concrete can be obtained that shows an impressive improvement in compressive strength compared to compostions with greater or lower diepoxide content.

The preferred range of polyepoxide to monoepoxide varies with the property that it is wished to maximize, and with the reactants but for the sake of illustration if a casting or molding with excellent flexural strength is required and the epoxides are styrene oxide and the di-terminal epoxide of bisphenol A, an epoxy-equivalent mole ratio of polyepoxide to monoepoxide of 0.4 to 0.5 is generally required. If, however, using the same reactants, the desired product is a polymer concrete with great compressive strength, a poly-to mono-epoxide epoxy-equivalent mole ratio of 0.3 to 0.4 is appropriate. For a foam product, the amount of expansion can be controlled by adjusting the poly-epoxide content and the amount of blowing agent. It is clear that with a lower amount of expansion, the density will be higher, and for a given poly-epoxide content, the amount of cross-linking which leads to dimensional stability and therefore compressive strength, will be higher. Thus the invention provides a system which is capable of a two-way adjustment by change in poly-epoxide content of amount of blowing agent to achieve a foam product of any desired density and compressive strength.

Where a foam system is required, it is possible to supply the necessary blowing agent by providing that at least part of the dicarboxylic acid anhydride is maleic anhydride which partially decomposes under reaction conditions to produce a gas which then generates the foam.

One of the most significant uses of the process of the invention lies in the production of molded objects whether in the foamed or unfoamed state. It will be appreciated that, as the reactants are in an essentially monomeric form, they are in a low viscosity state prior to the reaction even when mixed and the filling of a mold is a low-energy process by comparison with conventional injection molding techniques which involve high pressure-high temperature injection of molten polymer masses at high viscosity into mold cavities. In addition the reaction, once started, is completed within minutes, and the molded product has properties making it suitable for a wide range of uses. Further advantages over epoxy resins in the production of molded objects, include reduced costs and much smaller mold shrinkage on cooling.

It is clear, therefore, that the process of the invention is one of great flexibility that can be tailored to produce a wide variety of products of great utility.

The poly-terminal epoxide is one having a plurality of

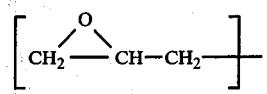

groups and may be obtained by reacting epichlorohydrin with a compound having a plurality of active hydrogen atoms.

Preferred epoxides are those having the formula

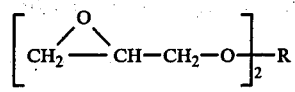

where R is a hydrocarbyl radical comprising at least two aromatic nuclei.

Typical poly-terminal epoxides may be obtained by reacting epichlorohydrin with for example a bisphenol such as bisphenol A, a polyamine such as diethylene tetramine, or a polyamide resin. Of these, those that can be formed by reacting epichlorohydrin with a hydroxyl-group containing compound are preferred. Apart from the bisphenol reaction product mentioned above, other compounds that can be reacted with epichlorohydrin to form useful poly-terminal epoxides include aliphatic diols and triols and novolac resins.

Bishphenol A, is a particularly useful compound from which a poly-terminal epoxide can be derived by reaction of the bisphenol A with epichlorohydrin. This is a wellknown compound and is readily available commercially from a number of sources. Polymerized with a small amount of a crosslinking agent such as an anhydride or a polyamine, it forms conventional epoxy-resins.

The mono-epoxide is a compound containing the ring structure,

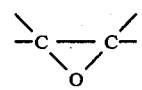

The simplest member of the epoxide family is ethylene oxide, wherein the pendant valencies are occupied by hydrogen atoms. By substituting various radicals for the hydrogen atoms, a large number of alternative epoxides can be derived. Since the epoxide of use in the invention is preferably a terminal epoxide, the pendant valencies on one of the carbons should be occupied by hydrogen. Typical epoxides include propylene oxide, butylene oxide, 1,2-hexylene oxide, styrene oxide and halostyrene oxides such as chloro-, bromo-, fluoro-, and iodo-styrene oxides and alpha-methystyrene oxide. In general, since the preferred process for producing such polyesters is operated at about atmospheric pressure and since low boiling epoxides would require operation at superatmospheric pressures, the preferred epoxides are those with a boiling point in or above the range of temperatures at which the polymer is made. In general, monoepoxides containing an aromatic radical meet this requirement.

The third reactant is an anhydride of a dicarboxylic acid comprising an anhydride group having the formula:

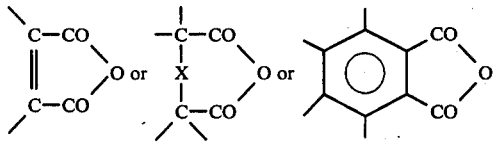

where —X— is a single bond or a saturated or unsaturated $C_1$-$C_6$ hydrocarbyl group.

Typical anhydrides include maleic anhydride, succinic anhydride, glutaric anhydride, adipic anhydride, and phthalic anhydride. For most purposes there is little advantage in providing an unsaturation in the anhydride molecule and the preferred anhydride is phthalic anhydride. If, however, it is intended to form a foam, it can be useful to provide that part at least of the anhydride is maleic anhydride since under the reaction conditions, it is found that maleic anhydride decomposes in part to yield carbon dioxide, thus providing an in-built blowing agent for the system.

The catalyst, under the influence of which the reaction takes place, is a quaternary salt and the anion of this compound can be, for example, a halogen, such as bromine or chlorine, or a $C_1$-$C_4$ alkoxy, phenoxy or hydroxyl group, and the cation can be, for example, tetramethyl ammonium, tetraethyl ammonium, and tetrabutyl ammonium and the corresponding phosphonium cations. Preferred salts include tetra($C_1$-$C_4$) alkyl ammonium bromides, chlorides, hydroxides and phenoxides and particularly tetraethyl ammonium bromide and tetramethyl ammonium hydroxide. Other suitable catalyst are indicated on Table 1 above.

The amount of catalyst generally required can be anything from a molar rato of 0.2:1 to 0.0001:1 of catalyst to anhydride. However, for most purposes a molar ratio of from 0.01:1 to 0.001:1 of catalyst to anhydride is adequate.

Where the intended end use of the product is as an adhesive, it is clearly desirable that it be not so heavily cross-linked that it cannot be dissolved in a solvent base. In such cases, a epoxy-equivalent mole ratio of poly- to monoepoxide of from 0.01 to 0.20 and particularly from 0.05 to 0.15 is preferred. Within this range, compositions having higher melt or softening temperatures will be found at the higher end of the above ratio range.

If it is desired to formulate a molding composition, it is usual to use a poly- to mono-epoxide epoxy-equivalent mole ratio of from 0.10 to 1.0 and preferably from 0.4 to 0.5 and as before, the melting or softening point of the product can be pre-determined by selection of the appropriate poly-to mono-epoxide ratio. In many cases it is advantageous to provide that the composition contains a filler which may be particulate or fibrous. Particulate fillers include sand, alumina, sawdust, feldspar, wollastonite, silicon carbide, finely divided metals such as iron and steel, metal compounds such as calcium carbonate and magnesium oxide, and other well-known particulate fillers such as titanium dioxide and carbon black. Preferably the Moh hardness of the filler is greater than 4. Fibrous fillers that can be used include both mineral fibers such as glass fibers and asbestos and synthetic polymers such as nylon, polyester and polyolefin fibers. Where such fillers are used the heat capacity of the filler slows the attainment of the temperature maximum so that the time in the reaction stages tends towards the stated maximum. In the absence of such fillers the maximum is reached much sooner, and frequently in very much less than 200 seconds.

The amount and type of filler used depends on the end use of the filled material. This can range from a tough, abrasion-resistant material where a large proportion of sand is used (a so-called polymer concrete) to a flexible glass fiber-filled material that can be thermoformed into any desired shape.

The polymer can also be foamed by incorporating into the composition a blowing agent, that is a compound that decomposes or volatilizes at reaction temperatures to give a gas. As indicated above, this may be done by the use of maleic anhydride in the reactive mass. The maleic anhydride may be used alone or better in combination with another anhydride this is not subject to decomposition at reaction temperatures. Use of maleic anhydride, however, leads to color formation and this is generally undesirable.

More preferably, however, the blowing agent is added separately in the form of a decomposable compound such as 1,1-azobisformamide, sulfonyl hydrazides, and N,N-dinitrosopentamethylene tetramine. As an alternative, the blowing agent can be a compound that is solid or liquid at normal temperatures, but which is vaporized under the reaction conditions. A suitable substance of this sort is water.

Surprisingly, it is found that the presence of water has little effect on the course of the reaction even though with a reaction between phthalic anhydride and styrene oxide to form a linear polyester, the presence of water in the reaction mixture can be shown to increase the acid number of the product quite markedly.

By a choice of a suitable poly-epoxy compound, it is also possible to obtain a flexible foam with excellent recovery from compression. Such a polyepoxy will characteristically be one that is based on a rubbery molecule such as an aliphatic polyepoxy compound, a diepoxide in which two aromatic rings are linked by a long aliphatic chain, certain polyamines, polysulfide rubbers and certain polyamides.

It may also be desirable, where a foam is desired, to enhance the formation of fine-celled foams by the use of a nucleating agent which is a very fine-grained substance such as talc or silica, around which cells can form.

The reaction is performed under closely defined conditions of time and temperature, and these are significant in achieving the desired result.

The polymers of the invention are prepared by a process characterized by a very rapid self-sustaining exothermic stage. Now the exothermic nature of the epoxide/anhydride reaction has been recognized in the past and attempts have been made to curb this heat evolution. Thus, the reaction vessel has been equipped with cooling devices such as cooling coils, the epoxide reactant has been added in stages and the reaction has been conducted in the presence of a diluent serving as a heat sink.

It has now been found, however, that the molecular weight of the polymer in the final product is dependent on the speeds with which the point at which the rapid self-sustaining exothermic reaction is initiated and the point of maximum heat evolution are reached and whether any cooling has occurred prior to that point sufficient to reverse the rate of temperature change. Thus, in a preferred form of reaction, the reactants are mixed and the temperature raised as quickly as possible to above the point at which the self-sustaining exothermic reaction is initiated and thereafter allowed to proceed without significant cooling at least until the peak temperature has been reached and substantially all available monomer has been consumed.

As a matter of practice, it is preferred that for more reactant combinations, the reaction mass is heated to from 70° to 180° C., or at least to above the temperature at which the rapid self-sustaining exothermic reaction proceeds without need for further heating, in from 30 to 200 seconds and preferably about 45 to 60 seconds.

the time for the reaction mixture to reach its maximum temperature, measured from the time the self-sustaining exothermic reaction initiation temperature is reached, is preferably from 10 to 200 such as, for example, about 30 seconds.

Of course, a limited amount of cooling may be permitted, but anything that reverses the rate of temperature change or prolongs the attainment of the maximum temperature leads to an increased acid number in the final product and, therefore, a lower molecular weight of the individual polymer molecules.

SPECIFIC EMBODIMENTS

The invention is further described with reference to the following examples which set forth the characteristic features of the polymers of the invention and the differences between them and those known in the art.

EXAMPLE 1

This Example illustrates the preparation of the polymer composition of the invention and the effect on polymer solubility and melt temperature of varying the proportion of poly-terminal epoxide to mono-terminal epoxide. For the sake of simplicity, the poly-terminal epoxides are referred to as "poly-epoxy's". The mono-terminal epoxide used throughout was styrene oxide. The catalysts used were either tetramethyl ammonium bromide (TMAB) or tetramethyl ammonium hydroxide (TMAH) plus water.

The variations in the composition were as set forth in Table 2 which also indicates the number of the polymer product, the polymer melting temperature (PMT) and the solubility in acetone.

5.0 gm of a solution containing phthalic anhydride, styrene oxide and a poly-epoxy were added to a 20mm × 150mm test tube. Some boiling chips and a catalyst were also added to the solution in the tube.

A thermometer was immersed in the solution in the tube which was then placed in an oil bath at 180° C. A rapid self-sustaining exothermic reaction was quickly initiated at about 160° C and reached a peak temperature in 30 seconds. The reaction had ceased altogether after a total of about 3 minutes in the oil bath. The test-tube was removed from the oil bath after 15 minutes, and after cooling, the test-tube was broken away from the product which was a solid polymeric material. This product which was very hard even when still at oven temperature was then ground to a powder and tested to determine its acid number, acetone solubility and polymer melt temperature.

TABLE 2

| Run No. | Poly-epoxy | Mole Ratio SO | Mole Ratio PA | Mole Ratio Poly-epoxy | Epoxy equiv. mole Ratio | TMAB | TMAH | $H_2O$ |
|---|---|---|---|---|---|---|---|---|
| 1 | A | 1.225 | 1.000 | 0.0375 | .06 | 0.02 | — | — |
| 2 | A | 1.150 | 1.000 | 0.0750 | .13 | 0.02 | — | — |
| 3 | A | 1.225 | 1.000 | 0.0375 | .06 | — | 0.020 | 0.095 |
| 4 | A | 1.150 | 1.000 | 0.0750 | .13 | — | 0.020 | 0.095 |
| 5 | B | 1.225 | 1.000 | 0.0375 | .09 | 0.02 | — | — |
| 6 | B | 1.150 | 1.000 | 0.0750 | .20 | 0.02 | — | — |
| 7 | B | 1.225 | 1.000 | 0.0375 | .09 | — | 0.020 | 0.095 |
| 8 | B | 1.150 | 1.000 | 0.0750 | .20 | — | 0.020 | 0.095 |
| 9 | C | 1.225 | 1.000 | 0.0375 | .06 | 0.02 | — | — |
| 10 | C | 1.150 | 1.000 | 0.0750 | .13 | 0.02 | — | — |
| 11 | C | 1.225 | 1.000 | 0.0375 | .06 | — | 0.020 | 0.095 |
| 12 | C | 1.150 | 1.000 | 0.0750 | .13 | — | 0.020 | 0.095 |

| Run No. | Acid No. | PMT(° C) | Acetone |
|---|---|---|---|
| 1 | 17 | 80–89 | Cloudy |
| 2 | — | 290 | Insoluble |
| 3 | 33 | 72–81 | Soluble |
| 4 | 24 | 53 89 | Soluble |
| 5 | 5 | 73–82 | Soluble |
| 6 | 8 | 278 | Cloudy |
| 7 | 44 | 69–75 | Soluble |
| 8 | 49 | 65–76 | Soluble |
| 9 | 15 | 75–92 | Soluble |
| 10 | 20 | 300 | Cloudy |
| 11 | 35 | 74–80 | Soluble |
| 12 | 64 | 78–88 | Soluble |

Polyepoxy A is a diglycidyl ether of bisphenol A with an epoxy equivalent wt. of 188.
Polyepoxy B is the tridycidyl ether of glycerol with an epoxy equivalent wt. of 150.
Polyepoxy C is a polyglycidyl ether of a novolac resin with an epoxy equivalent wt. of 175.
These Polyepoxy compounds are also used in the following Examples and identified in the same way throughout.

The data in Table 2 show the greater effectiveness of TMAB in producing high molecular weight polymers than TMAH and water and the dramatic difference in melting point observed when the epoxy-equivalent molar ratio of polyepoxy to SO is increased from 0.06 to 0.13.

EXAMPLE II

This Example describes the effect of varying the ratio of reactants in the production of the polyesters of the invention on the acid number and the polymer melt temperature and the results are charted in Table 3. The mono-epoxide was styrene oxide, the poly-epoxide varied and the anhydride was phthalic anhydride. The reaction profile is indicated by the time to reach the self-sustaining exothermic reaction ("EXOTHERMIC STAGE" in Table 3 for brevity) initiation, the temperature at which the self-sustaining exothermic reaction began, the time taken from initiation of the self-sustaining exothermic reaction to the maximum temperature reached and the maximum temperature.

The properties of the polyester obtained, i.e., acid number, and polymer melt temperature are also given. The reactant molar ratio is given for each run and corresponds as written to the following: styrene oxide/phthalic anhydride/polyepoxy compound/catalyst. Three sets of data are provided and within each set eight different experiments using different reactant ratios are used. In the first four of each the catalyst is tetramethyl ammonium bromide (TMAB) and in the second four the catalyst is tetramethyl ammonium hydroxide pentahydrate (TMAH). In the first eight, Polyepoxy A is used; in the secpnd eight, Polyepoxy B; and in the third eight, Polyepoxy C.

TABLE 3

| Feed (Molar Ratio) | Epoxy Equiv. Mole Ratio | Time To Exothermic Stage (Sec) | Threshold Threshold Of Exothermic Stage (° C) | Time From Threshold To Max. Temp. (Sec) | Max Temp. (° C) | Acid No. | Polymer Melt Temp. (° C) |
|---|---|---|---|---|---|---|---|
| 1.23/1.0/.038/.02 | 0.06 | 140 | 190 | 40 | 230 | ~17 | 80-89 |
| 1.15/1.0/.075/0.02 | 0.13 | 145 | 190 | 50 | 233 | insol | >290 |
| 1.00/1.0/0.15/0.02 | 0.30 | 180 | 190 | 15 | 240 | insol | >290 |
| 0.70/1.0/0.30/0.02 | 0.86 | 170 | 180 | 40 | 241 | insol | >290 |
| 1.23/1.0/.038/.02 | 0.06 | 95 | 160 | 23 | 228 | 33 | 72-81 |
| 1.15/1.0/.075/.02 | 0.13 | 90 | 180 | 30 | 229 | 24 | 75-89 |
| 1.00/1.0/.15/.02 | 0.30 | 120 | 178 | 35 | 250 | insol | >290 |
| 0.70/1.0/0.3/.02 | 0.86 | 115 | 180 | 35 | 247 | insol | >290 |
| 1.225/1.00/0.08/.02 | 0.09 | 120 | 180 | 30 | 230 | 5 | 73-82 |
| 1.15/1.00/0.075/.02 | 0.20 | 135 | 180 | 45 | 227 | 8 | 278 |
| 1.00/1.00/.15/.02 | 0.45 | 120 | 190 | 30 | 230 | insol | >290 |
| .70/1.00/.30/.02 | 1.29 | 115 | 190 | 35 | 251 | insol | >290 |
| 1.225/1.00/0.038/.02 | 0.09 | 75 | 150 | 30 | 228 | 44 | 69-75 |
| 1.15/1.00/0.075/.02 | 0.20 | 83 | 163 | 37 | 231 | 49 | 65-76 |
| 1.00/1.00/0.15/.02 | 0.45 | 80 | 185 | 40 | 231 | insol | >290 |
| .70/1.00/.30/.02 | 1.29 | 83 | 150 | 37 | 235 | insol | >290 |
| 1.23/1.00/0.038/.02 | 0.06 | 150 | 175 | 60 | 231 | 15 | 75-92 |
| 1.15/1.00/0.075/.02 | 0.13 | 145 | 185 | 30 | 230 | 20 | >290 |
| 1.00/1.00/0.15/.02 | 0.30 | 150 | 190 | 60 | 266 | insol | >290 |
| .70/1.00/0.30/.02 | 0.86 | 145 | 185 | 65 | 260 | insol | >290 |
| 1.225/1.00/.038/.02 | 0.06 | 88 | 160 | 32 | 234 | 35 | 74-80 |
| 1.15/1.00/.075/.02 | 0.13 | 90 | 160 | 30 | 232 | 64 | 78-88 |
| 1.00/1.00/0.15/.02 | 0.30 | 105 | 180 | 45 | 253 | insol | >290 |
| .70/1.00/0.30/.02 | 0.86 | 100 | 180 | 50 | 267 | insol | >290 |

EXAMPLE III

This Example illustrates the production of a foam from the polymer composition of the invention. In the runs described, the effects of varying the proportion of the polyepoxy and the amount of blowing agent are clearly set forth.

In each of the runs, the results of which are set forth in Table 4, a cylindrical mold having a diameter of 3.16cm, a length of 5.1cm and a volume of 45cc was used.

In each case the reactants (anhydride, styrene oxide and polyepoxy) were added to the mold along with any blowing agent and/or filler that may have been present.

After charging, the mold was partially immersed in an oil bath at 180° C. The mixture was stirred with a thermometer until the temperature reached 130° C and, usually in less than 30 seconds thereafter, foam development (where it occurred at all) was complete. In each case the mold was charged with the same amount of reactants which was enough to occupy approximately 15% of the mold volume. If on completion of foaming the mold was completely filled, 100% rise was assessed. Less than 100% rise indicates the extent to which the mold was filled. The foam was removed from the mold, and the density (in kgm. per cubic meter) and compressive strength (in kgm. per square cm.) of the foams were measured.

TABLE 4

| Run No. | Composition, Molar Ratio | | | | | Epoxy-equiv. mole Ratio | % Rise | Product Analysis | |
|---|---|---|---|---|---|---|---|---|---|
| | SO | PA | MA | Polyepoxy B | TMAB | | | Dens. kgm/m³ | Comp. Str. kgm/cm² |
| 1₁ | 0.973 | 1.000 | — | 0.109 | 0.0020 | 0.34 | 100 | 146 | .91 |
| 2₁ | 0.810 | 1.000 | — | 0.162 | 0.020 | 0.60 | 70 | 309 | .20 |
| 3₁,₂ | 0.647 | 1.000 | — | 0.216 | 0.020 | 1.00 | 0 | — | — |
| 4₃ | 0.974 | — | 1.000 | 0.109 | 0.020 | 0.34 | 100 | 93 | 1.69 |
| 5₃ | 0.811 | — | 1.000 | 0.162 | 0.020 | 0.60 | 100 | 157 | 3.94 |
| 6₃ | 0.648 | — | 1.000 | 0.217 | 0.020 | 1.00 | 50 | 280 | 16.7 |
| 7₃,₄ | 0.490 | — | 1.000 | 0.271 | 0.020 | 1.66 | 0 | — | — |
| 8₅ | 0.974 | 0.500 | 0.500 | 0.109 | 0.020 | 0.34 | 100+ | 90 | 1.34 |
| 9₅ | 0.811 | 0.500 | 0.500 | 0.162 | 0.020 | 0.60 | 100 | 106 | 2.60 |
| 10₅ | 0.647 | 0.500 | 0.500 | 0.216 | 0.020 | 1.00 | 75 | 221 | 9.4 |
| 11₅ | 0.326 | 0.500 | 0.500 | 0.325 | 0.020 | 2.99 | 0 | — | — |
| 12₈ | 0.974 | 0.500 | 0.500 | 0.109 | 0.020 | 0.34 | 50 | 461 | 29.2 |
| 13₇ | 0.647 | 0.500 | 0.500 | 0.216 | 0.020 | 1.00 | 100 | 114 | 4.15 |

₁contains 2.4 wt.% ABF*
₂runs with 0.489 SO, 1.000 PA, 0.271 Polyepoxy B and 0.326 SO, 1.000 PA and 0.325 Polyepoxy B showed no rise.
₃contains no ABF
₄run with 0.328 SO, 1.000 MA and 0.325 Polyepoxy showed no rise.
₅contains 1.2 wt.% ABF
₆contains 65 wt.% hydrated alumina
₇contains 35 wt. % alumina
*ABF is azobisformamide.

The above results show that with a epoxy equivalent ratio of polyepoxy B to styrene oxide of as low as 0.336, and using phthalic anhydride as the cyclic anhydride, foam can be obtained that has expanded to 100% of the mold volume and which remains stable at 180° C. On the other hand, if the above ratio is changed to 1.00, the composition does not foam. The results also show that the use of maleic anhydride in complete or partial replacement of phthalic anhydride can give rise to a foam even when no conventional blowing agent is added. The tendency of foam formation to decrease as the epoxy equivalent mole ratio of Polyepoxy B to styrene oxide increases is also significant.

EXAMPLE IV

This example shows the production of a polymer foam in which the blowing agent used to produce the foam is in part supplied by water.

In each case the reaction conditions and procedures described in Example III were used. The monoepoxide was styrene oxide (SO), the polyepoxy compound was polyepoxy A, the anhydride was phthalic anhydride (PA), the catalyst was tetraethyl ammonium bromide (TEAB) and the blowing agent comprised 1,1-azobisformamide (ABF) and water. In Table 5 the properties of the foams obtained are given.

TABLE 5

| Charge (Molar Ratio) | | | | | Wt. % | | Epoxy-Equiv. Mole Ratio | Total Epoxy/Anhydride Ratio (Mole) | Foam Density $kgm/m^3$ | Compr. Strength $kgm/cm^2$ |
|---|---|---|---|---|---|---|---|---|---|---|
| SO | PA | Polyepoxy A | TEAB | $H_2O$ | ABF | Alumina | | | | |
| .90 | 1.00 | .19 | 0.008 | 0.18 | .08 | 15 | 0.42 | 1.09 | 663 | 99.8 |
| .824 | 1.00 | .174 | .008 | .176 | .07 | 15 | 0.42 | 1.00 | No Foam | |
| .901 | 1.00 | .190 | .008 | .184 | .07 | 15 | 0.42 | 1.09 | 634 | 61.7 |
| .988 | 1.00 | .209 | .008 | .194 | .07 | 15 | 0.42 | 1.20 | 593 | 46.9 |
| 1.072 | 1.00 | .224 | .008 | .203 | .07 | 15 | 0.42 | 1.30 | 559 | 49.5 |
| 1.153 | 1.00 | .243 | .008 | .212 | .07 | 15 | 0.42 | 1.40 | 484 | 102 |
| 1.236 | 1.00 | .260 | .008 | .222 | .07 | 15 | 0.42 | 1.50 | 216 | 16.1 |

EXAMPLE V

This Example shows the use of the polymeric composition of the invention in the production of a polymer concrete.

A cylindrical steel mold was charged with from 90 to 100 grams of a polymer concrete mix consisting of 11.25 wt. % of polymeric binder (composition given in Table 6), 11.25 wt. % calcium carbonate and 77.50 wt. % of sand.

After packing, the cylinder was placed in an oven at 150° C for about 18 hours. The compressive strength of each sample was determined according to the method set out in ASTM - C -109 using an Instron Device.

TABLE 6

| Run No. | Poly-epoxy Used | Binder Composition, Molar Ratio | | | | | Epoxy equiv. Mole Ratio | Polymer Concrete, wt. % | | | Comp. Comp. Str. $kgm/cm^2$ |
|---|---|---|---|---|---|---|---|---|---|---|---|
| | | SO | PA | MA | Poly-epoxy | TMAB | | Bind. | Sand | $CaCO_3$ | |
| 1 | None | 1.302 | 0.500 | 0.500 | — | 0.025 | 0 | 11.25 | 77.50 | 11.25 | 112 |
| 2 | A | 1.150 | 0.500 | 0.500 | 0.075 | 0.020 | 0.13 | " | " | " | 187 |
| 3 | A | 1.002 | 0.500 | 0.500 | 0.150 | 0.019 | 0.30 | " | " | " | 895 |
| 4 | A | 0.851 | 0.500 | 0.500 | 0.224 | 0.020 TEAB | 0.53 | " | " | " | 469 |
| 5 | C | 1.147 | 0.500 | 0.500 | 0.109 | 0.019 | 0.19 | " | " | " | 469 |
| 6 | C | 1.005 | 0.500 | 0.500 | 0.151 | 0.019 | 0.30 | " | " | " | 726 |
| 7 | C | 0.848 | 0.500 | 0.500 | 0.224 | 0.019 | 0.53 | " | " | " | 691 |

For identification of Poly-epoxy's A and C, see Example 1.

It is noticeable that the compressive strength does not increase consistently with the poly-epoxy content, but shows a definite peak performance zone.

EXAMPLE VI

This Example shows the way in which the flexural yield strength of a sample of the polymeric composition of the invention varies with the ratio of styrene oxide to Polyepoxy in a non-linear fashion and defines a peak performance range of ratios.

Castings were prepared by addition about 60 grams of a mixture of styrene oxide, phthalic anhydride and Polyepoxy A at 95° C. to a Petrie dish which was then placed in an oven at 150° C for 30 minutes.

The cast product was removed from the oven and was found to be very hard and difficult to scratch with a metal spatula even when hot from the oven. After the product had been cooled and separated from the dish, samples were cut and tested for flexural strength by the method described in ASTM method D790.

The composition and performance data are given on Table 7 below.

TABLE 7

| Run No. | Casting Composition, Molar Ratio | | | | Epoxy-equiv. mole Ratio | Cure Temp. ° C. | Flex. Yield Strength $kgm/cm^2$ |
|---|---|---|---|---|---|---|---|
| | SO | PA | Poly-epoxy A | TEAB | | | |
| 1 | 1.000 | 1.000 | 0.150 | 0.015 | 0.30 | 155 | 615 |
| 2 | 0.944 | 1.000 | 0.175 | 0.016 | 0.37 | 155 | 567 |
| 3 | 0.889 | 1.000 | 0.200 | 0.016 | 0.45 | 155 | 968 |
| 4 | 0.833 | 1.000 | 0.225 | 0.016 | 0.54 | 155 | 371 |
| 5 | 0.778 | 1.000 | 0.249 | 0.016 | 0.64 | 155 | 355 |

It will be noted that the flexural yield strength passes through a maximum as the amount of the Polyepoxy A increases against the styrene oxide.

The above Examples are intended for use as illustration only of the general principles underlying the invention. It will be obvious to one moderately skilled in the art that many variations to and modifications of the processes described herein could be made without departing from the essential character of the invention. It is possible for example to incorporate into the polymer product the conventional flame retardants, antioxidants, coloring material, stabilizers and the like and it is intended that all such modifications and variations should be included within the full scope of the invention.

What is claimed is:

1. A polymeric material comprising a polyester produced by a process which comprises:
   a. forming a mixture of a cyclic diacid anhydride, a poly-terminal epoxide being the reaction product of one mole bisphenol A with two moles of epichlorohydrin, and a mono-terminal epoxide, the ratio of total epoxy groups to cyclic diacid anhydride groups being from 1:1 to 2:1 and the epoxy-equivalent mole ratio of polyepoxide to monoepoxide being from 0.01 to 1.0, and adding to said mixture a catalytically effective quaternary salt in an amount that is from 0.0001 to 0.2 mole per mole of anhydride, b. initiating a non-self-sustaining exothermic reaction between the epoxide and anhydride components of the mixture, c. raising the temperature of the mixture to a point at which the exothermic reaction becomes self-sustaining, and d. controlling the reaction conditions during the self-sustaining exothermic reaction such that the temperature of the reaction mixture is not substantially reduced until after the rate of evolution of heat by the reaction has begun to decrease; the time spent in stages b and c combined being less than 600 seconds.

2. A polymeric material according to claim 1 in which the time spent in stages $b$ and $c$ combined is less than 200 seconds and the time in stage $c$ between initiation of the self-sustaining exothermic reaction and the attainment of the maximum temperature reached is less than 600 seconds.

3. A polymeric material according to claim 1 in which the cyclic diacid anhydride is maleic anhydride, phthalic anhydride or a mixture of maleic and phthalic anhydrides.

4. A polymeric material according to claim 1 in which the mono-terminal epoxide is selected from the group consisting of styrene oxide, $\alpha$-methyl styrene oxide and halo-styrene oxides.

5. A polymeric material according to claim 1 in which the polyester is formed in the presence of from 0.01 to 0.001 mole of a tetra($C_1$–$c_4$)alkyl ammonium bromide or a tetra($C_1$–$C_4$)alkyl ammonium hydroxide per mole of anhydride.

6. A polymeric material according to claim 1 having an acid number not greater than 65 and a polymer melt temperature of at least 60° C. wherein the cyclic diacid anhydride is phthalic anhydride, the mono-terminal epoxide is styrene oxide, the quaternary salt is a tetraethyl ammonium bromide, the epoxy equivalent mole ratio of the poly-terminal epoxide to styrene oxide being from 0.01:1 to 1.0:1, the ratio of total epoxy groups to anhydride groups being from 1.0:1 to 2.0:1, the mole ratio of tetraethyl ammonium bromide to phthalic anhydride being from 0.01 to 0.001, steps $b$ and $c$ occur in less than 200 seconds at a temperature of at least 90° C. and at atmospheric pressure and the time spent in step $d$ is less than 200 seconds.

* * * * *

UNITED STATES PATENT AND TRADEMARK OFFICE
CERTIFICATE OF CORRECTION

PATENT NO. : 4,125,520

DATED : November 14, 1978

INVENTOR(S) : James C. Hill, Walter R. Knox

It is certified that error appears in the above-identified patent and that said Letters Patent are hereby corrected as shown below:

Column 1, line 21, "round" should read: --found--.

Column 1, line 44, "aromtic" should read: --aromatic--.

Column 1, line 58, "wuch" should read: --such--.

Column 1, line 67, "through" should read: --though--.

Column 2, line 56, "on" should read: --one--.

Column 4, line 63, "of" should read: --or--.

Column 11, line 46, insert --acid-- between "the" and "number".

Column 11, line 12, first word "the" should be capitalized --The--.

UNITED STATES PATENT OFFICE
CERTIFICATE OF CORRECTION

PATENT NO. : 4,125,520
DATED : November 14, 1978
INVENTOR(S) : James C. Hill, Walter R. Knox It is certified that error appears in the above-identified patent and that said Letters Patent are hereby corrected as shown below:

Column 14, Table 4, first number under Heading "TMAB" - "0.0020" should read: --0.020--.

Column 16, Table 6, last column heading - delete first "Comp-".

Signed and Sealed this

*Seventh* Day of *August 1979*

[SEAL]

*Attest:*

LUTRELLE F. PARKER
*Attesting Officer*   *Acting Commissioner of Patents and Trademarks*